G. E. CASSEL.
FRICTION RATCHET GEAR.
APPLICATION FILED FEB. 17, 1920.

1,377,559.

Patented May 10, 1921.
2 SHEETS—SHEET 1.

Inventor
Gunnar Elias Cassel,
By Henry Ott Jr.
Atty.

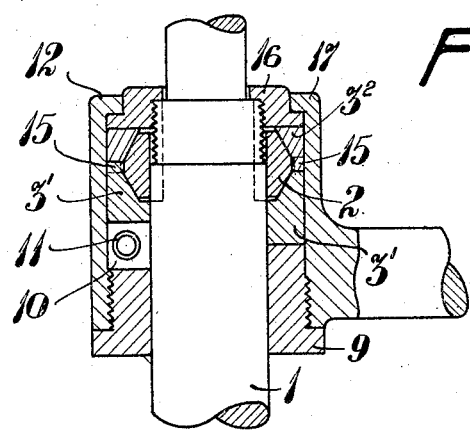
Fig. 4
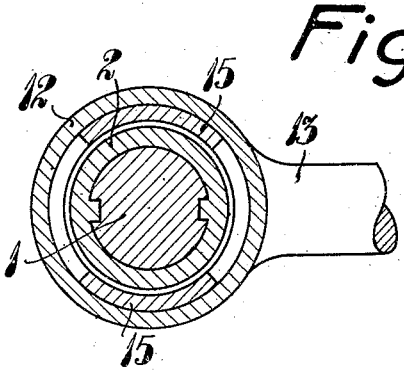
Fig. 5
Fig. 6
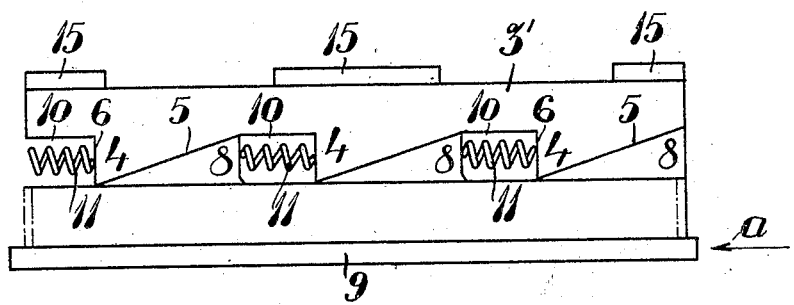

UNITED STATES PATENT OFFICE.

GUNNAR ELIAS CASSEL, OF STOCKHOLM, SWEDEN, ASSIGNOR TO AKTIEBOLAGET GYRO, OF STOCKHOLM, SWEDEN, A CORPORATION OF SWEDEN.

FRICTION RATCHET-GEAR.

1,377,559.  Specification of Letters Patent.  Patented May 10, 1921.

Application filed February 17, 1920. Serial No. 359,479.

*To all whom it may concern:*

Be it known that I, GUNNAR ELIAS CASSEL, a citizen of the Kingdom of Sweden, residing at Stockholm, Sweden, have invented new and useful Improvements in Friction Ratchet-Gears, of which the following is a specification.

This invention relates to friction ratchet gears of the kind comprising annular elements mounted around a common shaft and in which the friction surface between the driving and the locking elements consists of a helicoidal surface, while the friction surface between the locking element and the driven element consists of a conical surface. In ratchet gears of this type as heretofore known it was impossible to overcome a certain back-lash, furthermore, a certain, rather considerable power was required for releasing the engagement between the various elements in the return movement. Said inconveniences have rendered such ratchet gears unreliable and useless for many purposes for which such ratchet gears would otherwise be suitable.

This invention has for its object to provide a friction ratchet gear of the above said kind in which the said inconveniences are overcome. The essential feature of the invention consists in that the angle of inclination of the helicoidal surface is greater than twice the angle of friction of the helicoidal surface but smaller than the sum of said angle of friction and the ideal angle of friction of the driven element, while the top-angle of the conical surface is greater than twice the angle of friction of said surface. By so choosing the angles the device will become self-locking in operation and self-releasing, as soon as the driving power ceases to work.

Figure 1:
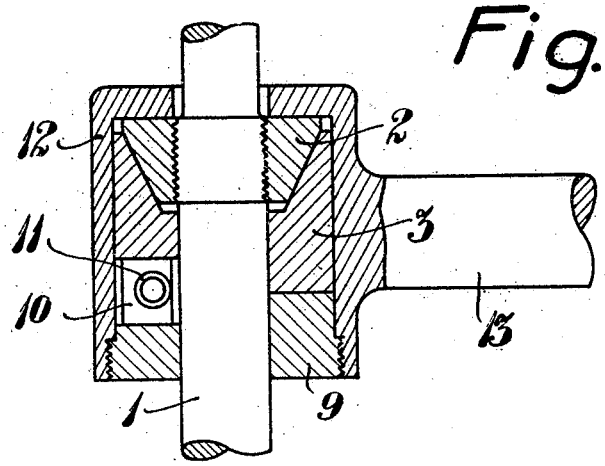

Two embodiments of the invention are illustrated in the accompanying drawing. Figure 1 shows an axial section and Fig. 2 an end view of a ratchet gear according to one embodiment of the invention. Fig. 3 shows the driving element and the locking element of said ratchet gear in unfolded state. Fig. 4 shows an axial section and Fig. 5 a cross section of a ratchet gear according to the other embodiment of the invention. Fig. 6 shows the driving and the catch elements of said ratchet gear in unfolded state.

Figure 2:
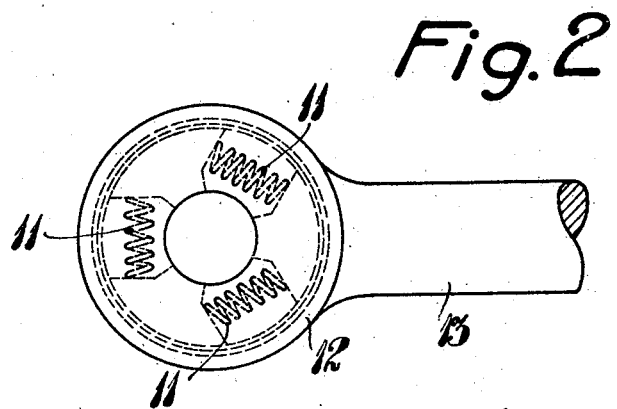
Figure 3:
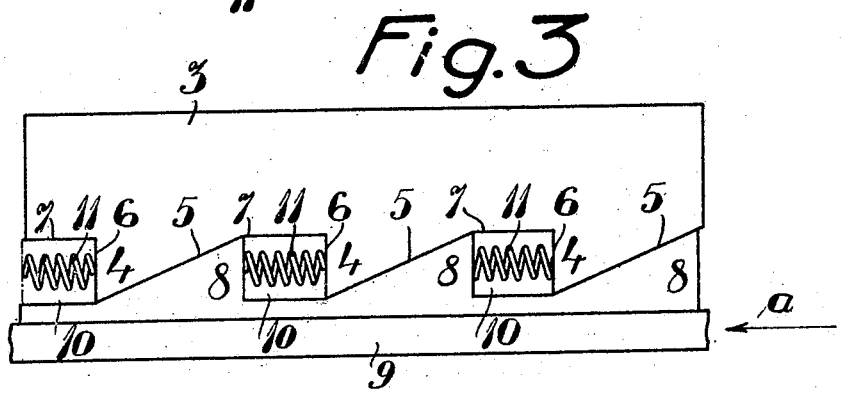

In the embodiment shown in Figs. 1–3, 1 indicates a shaft to be driven by the ratchet gear. Threaded on this shaft is a conical ring 2 engaging a corresponding conical recess formed in a ring 3, loosely surrounding the shaft 1 and the end surface of which remote from the cone 2 being provided with a number of teeth 4 (for instance three) defined by helicoidal surfaces 5 and axial surfaces 6. Between the axial surface of any tooth and the helicoidal surface 5 of the adjacent tooth there is a radial surface 7. The helicoidal surfaces 5 bear against corresponding surfaces of similar teeth 8 formed on a ring 9 likewise rotatably surrounding the shaft 1. The last-mentioned ring is screwed into a sleeve 12 inclosing the members 3 and 2 and the bottom surface of which bears against the base of the cone 2 said sleeve being formed with a radial extension 13 forming either a handle or a reciprocating machine element. Between the axial limiting surfaces of the teeth 4 and 8 there are formed chambers 10 each containing a pressure spring 11. Said springs tend to turn the member 3 so as to move it against the member 2 and are so adjusted as to maintain the member without material pressure in contact with the member 2.

In the friction ratchet gear as above described the sleeve 12 with the ring 9 forms the driving member, and the cone 2 with the shaft 1 forms the driven member, while the ring 3 forms the means for locking said two members together. The operation of the device is generally as follows: By turning the sleeve 12 with the ring 9 in the direction of the arrow *a* in Fig. 3, the cone 2 due to the pressure exerted by the helicoidal surfaces upon the member 3 will be locked between the member 3 and the bottom of the sleeve 12 so that the cone 2 and thus also the shaft 1 are caused to turn with the sleeve 12. As soon as the turning of the sleeve 12 in said direction ceases and the pressure on the member 3 is thereby released, the interlocking of the parts immediately ceases so as to permit the turning back of the sleeve 12 without the need of any power for releasing the engagement between the parts of the device. In other words, the device operates without any back-lash in the forward turning movement and completely without any pull in the backward turning movement. For attaining said result the device is so constructed as to answer to the following conditions: The locking element 3 is made self-releasing with respect to the helicoidal surface 5 the angle of inclination of the said surface being greater than twice the angle of friction of said surface. Furthermore, the locking element is self-releasing with respect to the conical surface the top-angle of the conical surface being greater than twice the angle of friction of said surface. If the angle of inclination of the helicoidal surface is indicated by $\alpha_1$, the angle of cone by $\alpha_2$, the angle of friction of the screw-surface by $s_1$ and that of the conical surface by $s_2$, the said condition will be as follows:

(1) $\alpha_1 > 2s_1$
(2) $\alpha_2 > 2s_2$

Said two conditions will secure the self-releasing effect of the device.

In order that the device may be self-locking when in operation, that is when the locking element 3 is subjected to pressure from the member 9 it is necessary that the angle of inclination of the helicoidal surface is smaller than the sum of the angle of friction of said surface and the ideal angle of friction of the cone or, expressed in a formula:

(3) $\alpha_1$ must be $< s_1 + s_3$ where $s_3$ represents said ideal angle of friction.

It is well known that $s_3$ is determined by the equation $$tg\ s_3 = \frac{tg\ s_2}{\frac{\sin \alpha_2}{2} + tg\ s_2 \frac{\cos \alpha_2}{2}}$$

In the embodiment above described the top angle of the cone must be chosen so small as to differ from twice the angle of friction of the conical surface by a small amount only, whereby a very close adjustment of the top-angle of the cone is required for preventing locking while, on the other hand, an ample lubrication may cause slipping so that also the lubrication must be closely adjusted.

Thus, it may be desirable to render the cone less sensitive to said circumstances. This will be obtained, if the single cone be replaced by a double cone. One embodiment of a friction ratchet gear having a double cone is shown in Figs. 4–6.

The driven member of this friction ratchet gear consists of the double cone 2 which is slidably but not rotatably mounted on the shaft 1. The locking element consists of two rings $3^1$, $3^2$ having conical recesses and engaging one another by means of teeth 15 so as to be movable from and toward one another but not rotatable with respect to one another. The member $3^1$ is formed, in the same way as the ring 3 of the embodiment above described, with teeth 4 on its end surface remote from the cone 2, said teeth being defined by helicoidal surfaces 5 and axial surfaces 6. The inclined surfaces 5 of said teeth bear against corresponding surfaces of teeth 8 formed on the driving member 9 which as in the embodiment above described is screwed into a sleeve 12 provided with a radial handle 13. The member $3^2$ of the locking element bears with its end surface remote from the cone 2 against a ring 16 screwed on the shaft 1. Bearing against a shoulder 17 of said ring is the bottom of the sleeve 12 which consists of a narrow flange only.

In this embodiment the conditions represented in the foregoing by the relations 1/, 2/ and 3/ are fulfilled for securing self-releasing and self-locking effect in operation. To the expression for $tg\ s_3$ there is in this case added a quantity depending on the friction between the upper locking member $3^2$ and the driven members 2 and 16. It may now be mathematically proved that the conditions necessary for the proper operation of the device will be fulfilled by a materially higher value of $\alpha_2$, that is the top angle of the cone, than in the embodiment above described. The operation is for the rest similar to the operation of the embodiment described in connection with Figs. 1–3.

Having now particularly described and ascertained the nature of my said invention and in what manner the same is to be performed, I declare that what I claim is:—

1. In a friction ratchet gear the combination with a shaft, of an annular driving element loosely mounted on the shaft and having a helicoidal friction surface, an annular driven element secured to the shaft and having a conical friction surface, an annular element mounted between said friction surfaces for interlocking said driving and driven elements, and a sleeve inclosing said elements and said member, said sleeve being rigidly secured to the said driving element.

2. In a friction ratchet gear the combination with a shaft, of an annular driving element loosely mounted on said shaft and having teeth formed on its one end surface the inclined surfaces of said teeth forming a helicoidal friction surface, an annular driven element rigidly secured to said shaft, an annular locking element mounted between said driving and driven elements and having teeth formed on its one end surface for coöperation with the teeth of the driving element, and springs situated between the teeth of the driving element and those of the locking element.

3. In a friction ratchet gear the combination with a shaft, of an annular driving element loosely mounted on said shaft and having teeth formed on its one end surface, an annular driven element having a conical friction surface, an annular locking element mounted between said first-mentioned elements and having teeth formed on its one end surface for engagement with the teeth of the driving element, while having a conical recess formed in its other end surface for engagement with the conical friction surface of the driven element, springs mounted between the teeth of the driving element and those of the locking element, and a cup-shaped sleeve rigidly connected with the driving element and inclosing said elements said sleeve being provided with a handle.

In testimony whereof I have signed my name.

GUNNAR ELIAS CASSEL.